June 28, 1960

N. W. BURLIS ET AL 2,943,207

INSTRUMENT LINEARIZER

Filed July 22, 1957

INVENTORS
NORBERT W. BURLIS
MILTON J. REINERT

BY

ATTORNEY

June 28, 1960   N. W. BURLIS ET AL   2,943,207
INSTRUMENT LINEARIZER
Filed July 22, 1957   2 Sheets-Sheet 2

INVENTORS
NORBERT W. BURLIS
MILTON J. REINERT
BY
ATTORNEY

United States Patent Office 2,943,207
Patented June 28, 1960

2,943,207
INSTRUMENT LINEARIZER

Norbert W. Burlis, St. Louis, and Milton J. Reinert, Ferguson, Mo., assignors to Custom Engineering and Development Co., a corporation of Missouri Filed July 22, 1957, Ser. No. 673,431

3 Claims. (Cl. 250—217)

The principal object of this invention is to provide a device which can apply an instantaneous correction to the output of an instrument or a group of interconnected instruments, whose output function with respect to input deviates from true linearity.

Another object is to provide a simple, economical method of inserting correction factors for a given instrument set-up.

An additional object is to provide an instrument which can utilize an ordinary calibration curve, drawn in the customary manner on an ordinary sheet of paper, to produce instantaneous readout of corrected output data, so that a change in the instrument set-up can be compensated for merely by drawing a new calibration curve in the ordinary manner.

A further object is to provide an instrument which can be employed to read out errorless data, a device which will correct its own non-linearity.

A final object is to provide an instrument which can be employed to discover correlations in large masses of data, in which it can be assumed that one variable is a dependent function of another.

The above and other objects and features of the invention will become more apparent upon reading the following detailed description with reference to the accompanying drawings, in which.

Figure 1:
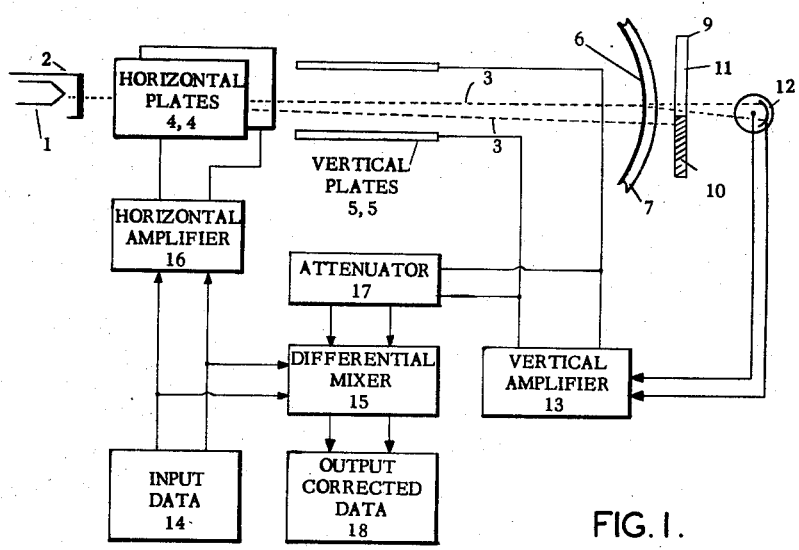
Fig. 1 is a digrammatic representation of a preferred embodiment of the invention, showing also the electron beam path through the oscilloscope, together with the calibration curve and the photocell.
Figure 2:
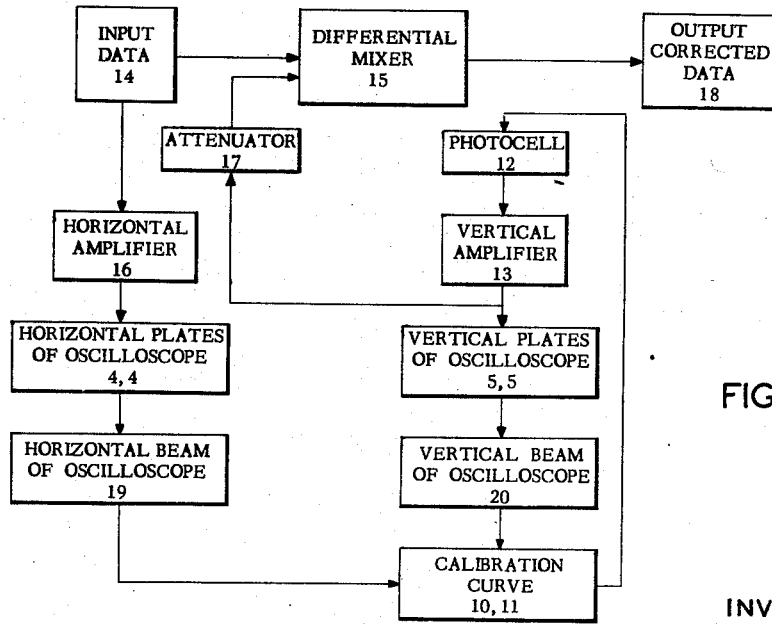
Fig. 2 is a schematic block diagram depicting the circuit arrangement.

In Fig. 1 is shown the basic components of an oscilloscope or cathode ray tube, including the customary electron gun or beam-producing means such as the filament 1 and the cathode 2 which is indirectly heated by said filament. The beam path is denoted by the dotted lines 3, 3. Disposed along the path of the electron beam are the two horizontal deflection plates 4, 4 and the two vertical deflection plates 5, 5. After passing between the two sets of deflection plates the beam impinges upon the phosphor coating 6 with which the face 7 of the glass envelope of the oscilloscope is customarily lined.

Figure 3:
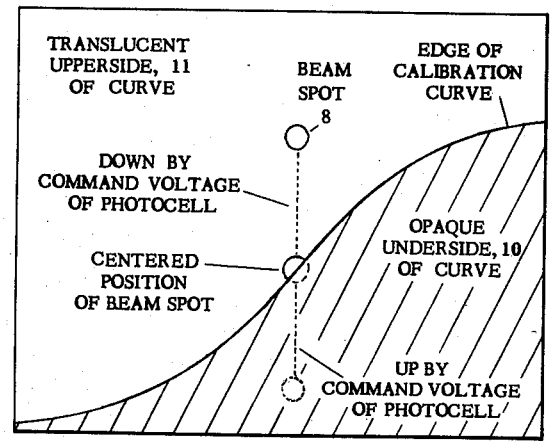
Fig. 3 is an explanatory representation of a typical correction curve, and its interaction with the beam spot on the face of the oscilloscope.

Impingement of the beam upon the phosphor coating 6 results in production of the customary beam spot 8, shown in Fig. 3, in the form of a luminescent spot whose positions in the two dimensions of the face 7 of the oscilloscope are controlled by the voltages on the two sets of deflection plates 4, 4 and 5, 5.

Closely adjacent to the face 7 of the oscilloscope is placed the sheet of paper shown in cross-section in Fig. 1 and shown after cutout as Fig. 3. Upon this sheet of paper has been drawn a calibration or correction curve, in the customary manner. We prefer to have the curve drawn on an ordinary piece of plain white stationery, or upon graph paper on which the lines are very faint, that is, do not absorb much light. After the curve has been accurately drawn, the underside 10, of the calibration curve is rendered completely opaque to light and to the beam spot 8 in particular, by painting it or inking it with ordinary India drawing ink and the portion of the paper above the curve is cut away with a pair of scissors to have a transparent upperside 11, above the opaque underside of the curve.

In this condition the upperside 11, of the calibration curve, will transmit the beam spot in full intensity but the underside 10 of the calibration curve will not. The upperside of the curve 11 would ordinarily be termed to be translucent to light, however the beam spot 8 is of such high relative intensity when compared to the remainder of the face 7 of the tube that the upper side 11 of the curve may be termed transparent to the beam spot 8.

In the event that extreme accuracy is required, the calibration curve of the instrument set-up may be drawn on a very large sheet of graph paper, with a great many points plotted closely together. Then the underside 10 of the curve may be blackened or otherwise rendered opaque and a photostat, reduced to a convenient size, may be made from said larger calibration curve. After this the underside of the curve on the photostat is cut into a template form as before. Said photostat will then be employed as the correction curve. In either case the resulting bipartite calibration curve is then mounted in the position of Fig. 1, between two relatively thin sheets of glass or transparent plastic, not shown, so that it is disposed vertical to the longitudinal axis of the cathode ray tube or oscilloscope.

On the other side of the calibration curve in Fig. 1 is disposed the photocell 12. The photocell output is connected through the vertical amplifier 13 to the vertical plates 5, 5 of the oscilloscope.

Input data 14, in the form of voltages proportional to the "bits" of information derived from a given instrument set-up, is fed to the differential mixer 15. The input data 14 is also fed to the horizontal amplifier 16. From there, the output of the horizontal amplifier 16 is fed to the horizontal deflection plates 4, 4 of the oscilloscope.

A portion of the amplified output of the photocell 12, derived from the vertical amplifier 13, is fed through an attenuator 17. The output of the attenuator is directed into the differential mixer 15. This output constitutes the "correction." The input data 14, plus the output of the attentuator 17, in the differential mixer 15, form the output corrected data 18.

If the beam spot 8 of Fig. 3 lies on the upper side 11 of the calibration curve, the beam spot will be "seen" by the photocell 12, resulting in a full intensity photocell output. The photocell circuitry is so arranged that full photocell output, through the vertical amplifier 13, generates a command voltage on the vertical plates 5, 5 of the oscilloscope to drive the beam spot down toward the calibration curve.

Conversely, if the beam spot 8 lies on the underside 10 of the calibration curve, the beam spot 8 will be masked by the opaque character of the underside 10 and will not be "seen" by the photocell, resulting in a minimum intensity photocell output. Through the vertical amplifier 13, the output of the photocell generates a command voltage on the vertical deflection plates 5, 5 of the oscilloscope to drive the beam spot 8 up toward the calibration curve.

As these command signals are continuously sent to the vertical deflection plates 5, 5 in accordance with the output of the photocell 12, the only resultant stable position of the beam will lie centered on the edge of the correction curve, as shown at approximately the center of Fig. 3.

Thus we have "slaved" the beam to the edge of the correction curve by means of a closed servo loop, using the error signal derived from the photocell 12 as the initiator of the command voltage.

The horizontal position of the beam spot is determined by the voltage on the horizontal deflection plates and is proportional to the voltage which constitutes the input data, or the uncorrected data fed the Linearizer. The horizontal position dictated by the horizontal deflection plates is the abscissa of the correction curve.

The voltage which is necessary on the vertical deflection plates 5, 5 of the oscilloscope to set the beam spot 8 in centered position on the edge of the correction curve, is the measure of the magnitude of the ordinate of the correction curve at that input voltage of the horizonlaal deflection plates 4,4.

This ordinate is the value of the correction which must be added to the original input voltage 14, to form the output corrected data 18. In the attenuator 17 the output of the vertical amplifier 13 is tapped and decreased in value. The purpose of the attenuator is to match the level of the "correction," derived from the vertical plates and the closed servo loop through the pho- cell 12, to the level of the input data 14 in the differential mixer 15, which is a resistance network, so that the additon of the two will produce the output corrected data 18. The result is a corrected output which is recorded in the customary manner.

The linearizer is so designed that it can be interposed in an instrument set-up, between the output data which would ordinarily go directly to the recorder, and that recorder. Thus the output data of the instrument set-up becomes the input data 14. The calibration curve for the instrument set-up is drawn and inserted in its appropriate position between the face 7 of the oscilloscope and the photocell 12. Then the output of the linearizer is corrected data fed to the recorder.

A principal advantage of the system lies in its speed of response, which is of the order of one-half of a millisecond.

Another advantage is the relative ease with which correction or calibration curves can be substituted, one after another, for different instrument set-ups.

By using the principle of mixing, that is, of adding the error correction to the original signal, the input data 14, the advantage is obtained that the accuracy of the final output is much higher than the accuracy inherent in the design of the linearizer itself. This conclusion is due to the fact that the accuracy of this correcting instruments acts only on the correction portion of the total corrected output data.

Therefor, assume that a ninety volt input must be corrected by the use of the correction curve to read an output of 100 volts. The correction to be added is ten volts at the 90 volt reading. If the linearizer itself were to have an inherent error as great as a five percent error at these values, this five percent error acts only on the correction portion, that is, only on the 10 volts to be added. Five percent of 10 volts is only ½ volt. Therefore, it will be possible to correct the output to read between 99½ volts and 100½ volts as the output of a device having a five percent error. This represents an overall error of plus or minus one-half of a percent.

For a higher order of data correction, and in order to produce completely errorless data, it is possible to approach the problem in a manner hitherto unknown.

The correction curve for the instrument set-up is not itself inserted in the linearizer. This correction curve is first modified by the calibration curve of the linearizer, to produce a modified correction which completely eliminates the error of the linearizer.

In the example chosen, let us again consider correcting a 90 volt input to read out as 100 volts.

We have assumed that the correction for the instrument set-up at that level to be 10 volts. We will further know from our calibration curve of the individual linearizer instrument itself what the exact value of the error is at 90 volts input and 10 volts correction. If the error is negative by the amount of five percent of the correction as hereinabove explained, then the readout of the linearizer will be five percent less than 10 volts correction out of the uncalibrated linearizer, i.e. 99½ volts. Consequently the modified correction curve for the instrument set-up, including the linearizer itself as part of the instrument set-up, will add 10½ volts, rather than 10, at 90 volts input data. The 10½ volt correction added through the linearizer to the 90 volts input data will read out as 100 volts exactly.

Another method of obtaining errorless data from the linearizer consists in using a modified graph paper for the sheet of paper 9 in the linearizer. If calibrated graph paper is used on which the spaces between the lines in the direction of the ordinate, do not have a constant value but vary in accordance with the calibration curve of the individual linearizer instrument itself, then correction curves drawn on this paper will control the readout of errorless corrected data.

It often occurs that researchers are confronted with the problem of discovering correlations burried, but inherent, in masses of data. In certain of these cases the conventional approach is to assume that one of the variables being studied is actually some function of another of these variables.

The linearizer finds an important usage in this connection, for rapidly checking the veracity of such assumptions. For if it be assumed that a certain variable, "$y$" is a function of $x$, then:

$$y=F(x)$$

then the appropriate curve for the inverse function is drawn and placed in the linearizer as the calibration curve.

The curve will read:

$$y=\frac{1}{F(x)}$$

Now the data input is fed in the linearizer, but only to the horizontal amplifier; the path to the differential mixer 15 is broken. If the output of the linearizer has a constant value, that is, reads out a straight line on a recorder, then the assumption is correct, and the correlation exists. This procedure is most convenient because the discovery curve, which is the curve of the inverse function, can be quickly drawn on an ordinary sheet of paper, the underside opaqued and this assumption verified immediately. A great variety of such assumptions can be checked in a short space of time with a given instrument set-up and a corresponding variety of discovery curves of inverse functions.

While we have described one form of apparatus, this has been done by way of illustration only, and many changes and modifications may be made in its details without departing from the essence of the invention.

What we claim as new is:

1. In a system for correcting data generated in the form of voltages proportional to bits of information derived from a given non-linear instrument set-up, a cathode ray tube capable of emitting a cathode ray beam, vertical and horizontal beam-deflecting means in said cathode ray tube, a luminous screen in said cathode ray tube, a photocell exposed to light from said screen, a calibration curve interposed between said photocell and the screen of said cathode ray tube, and having clearly defined areas of contrasting transparency and opacity, means for controlling the deflection by one of the sets of deflecting means in said tube in accordance with the variation of input data, and means for controlling the deflection on the other set of deflecting means in said tube in accordance with the variation of light impinged on said photocell to restore a state of equilibrium and means for mixing the input data with the output of the photocell to correct the input data to produce output errorless corrected data, said calibration curve consisting of the summation curve derived by adding the correction curve of the non-linear instrument set-up to the error correction curve for the cathode ray tube, the photocell, the means for controlling both deflecting means and the means for mixing the input data with the output of the photocell.

2. In a system responsive to input data generated in the form of voltages derived from a given non-linear instrument set-up, a cathode ray tube capable of emitting a cathode ray beam, a luminous screen in said cathode ray tube, a photocell exposed to light from said screen, a summation calibration curve for said input data having an underside and an upperside of highly contracting degrees of opacity, a plurality of deflecting means for causing the light generated by said cathode ray beam to follow the edge between the underside and upperside of said summation curve, one of said deflecting means causing the beam to move horizontally toward the summation curve edge in response to control by said input data, the other of said deflecting means driving the beam vertically to a centered position on said edge, said second deflection means providing a vertical deflection output voltage proportional to the summation correction applied through said curve and controlled by said photocell and differential mixer means to add said summation correction to the input data to produce summation corrected errorless output data said summation calibration curve derived by adding the correction curve of the non-linear instrument set-up generating input data to the error correction curve for the cathode ray tube, the photocell, the deflecting means and the differential mixer means.

3. In a system for correcting non-linear input data generated by a given instrument set-up, a cathode ray tube capable of emitting a cathode ray beam, a luminous screen in said cathode ray tube, a photocell exposed to light from said screen, a summation calibration curve for said input data having an underside and an upperside of highly contrasting degrees of opacity, a horizontal amplifier, horizontal deflecting plates in said cathode ray tube to which the input data is fed through the horizontal amplifier, vertical deflecting plates in said cathode ray tube, a vertical amplifier to which the output of the photocell is directed, and whose output is fed to the vertical plates of the oscilloscope, said photocell, vertical amplifier, vertical plates and summation calibration curve forming a closed servo loop to slave the beam to the summation calibration curve, said calibration curve for said input data formed by the summation of the calibration correction curve for the data source and the error correction curve for the closed servo loop itself, an attenuator in which the output of the vertical amplifier is decreased to match the level of the input data and a differential mixer, said summation calibration curve derived by adding the correction curve of the non-linear instrument set-up to the error correction curve for the cathode ray tube, the photocell, the horizontal amplifier, the vertical amplifier, the attenuator and the differential mixer to generate the summation correction in the attenuator consisting of the calibration correction plus the error correction, said summation correction in said differential mixer added to the errorless input data to form the output corrected data.

References Cited in the file of this patent
UNITED STATES PATENTS

| | | |
|---|---|---|
| 2,528,020 | Sunstein | Oct. 31, 1950 |
| 2,656,101 | Haviland | Oct. 20, 1953 |
| 2,734,137 | Patterson | Feb. 7, 1956 |
| 2,849,180 | Burke et al. | Aug. 26, 1958 |

OTHER REFERENCES

Electronic Analog Computers, Korn & Korn, published by McGraw Hill Co., Inc. 1952, 378 pages; pages 247–250 and 256 relied upon.